United States Patent
Pavani (10) Patent No.: US 9,135,683 B2
(45) Date of Patent: Sep. 15, 2015

(54) SYSTEM AND METHOD FOR TEMPORAL VIDEO IMAGE ENHANCEMENT

(71) Applicant: ARECONT VISION, LLC., Glendale, CA (US)

(72) Inventor: Sri Rama Prasanna Pavani, Los Angeles, CA (US)

(73) Assignee: ARECONT VISION, LLC., Glendale, CA (US)

( * ) Notice: Subject to any disclaimer, the term of this patent is extended or adjusted under 35 U.S.C. 154(b) by 15 days.

(21) Appl. No.: 14/018,952

(22) Filed: Sep. 5, 2013

(65) Prior Publication Data

US 2015/0063717 A1 Mar. 5, 2015

(51) Int. Cl.
| | |
|---|---|
| G06T 5/00 | (2006.01) |
| G06K 9/00 | (2006.01) |
| G06K 9/46 | (2006.01) |
| G06K 9/62 | (2006.01) |
| H04N 5/57 | (2006.01) |
| G06T 5/20 | (2006.01) |

(52) U.S. Cl.
CPC ............ *G06T 5/002* (2013.01); *G06K 9/00758* (2013.01); *G06K 9/46* (2013.01); *G06K 9/6202* (2013.01); *G06T 5/20* (2013.01); *H04N 5/57* (2013.01); *G06T 2207/10016* (2013.01); *G06T 2207/20024* (2013.01); *G06T 2207/20182* (2013.01)

(58) Field of Classification Search
CPC ... G06K 9/00758; G06K 9/46; G06K 9/6202; G06T 5/002; G06T 5/20; G06T 2207/10016; G06T 2207/20024; G06T 2207/20182; H04N 5/57

USPC ............ 382/260, 261, 266; 348/620, E50.77, 348/E9.013; 375/240.15, 240.24, 240.16, 375/E7.193, E7.106, E7.258, E7.211, 375/E7.285, E7.263, E7.205, E7.088
See application file for complete search history.

(56) References Cited

U.S. PATENT DOCUMENTS

| | | | | |
|---|---|---|---|---|
| 5,040,060 | A | * | 8/1991 | Owada et al. ............ 375/240.24 |
| 5,438,374 | A | * | 8/1995 | Yan ................................. 348/620 |
| 6,064,776 | A | * | 5/2000 | Kikuchi et al. ................ 382/260 |
| 6,931,065 | B2 | * | 8/2005 | Kim ........................ 375/240.16 |
| 7,034,892 | B2 | | 4/2006 | Ojo et al. |
| 7,149,325 | B2 | * | 12/2006 | Pavlidis et al. ............... 382/103 |
| 8,320,698 | B2 | | 11/2012 | Baqai |
| 8,345,971 | B2 | | 1/2013 | Zhang et al. |
| 8,446,964 | B2 | | 5/2013 | MacInnis et al. |
| 2003/0123551 | A1 | * | 7/2003 | Kim ........................ 375/240.16 |
| 2004/0201753 | A1 | * | 10/2004 | Kondo et al. .................. 348/239 |

(Continued)

*Primary Examiner* — Mekonen Bekele
(74) *Attorney, Agent, or Firm* — Christie, Parker & Hale, LLP (57) ABSTRACT

A method for improving quality of low light video images including: receiving a current video frame; temporally enhancing it by applying a first weight matrix including higher weight factors for stationary regions and lower weight factors for moving regions to the received frame and a reference frame to generate an enhanced temporal video frame; spatially enhancing the enhanced temporal video frame by applying a second weight matrix including higher weight factors for stationary regions and lower weight factors for moving regions to generate an enhanced spatial video frame; and motion enhancing the enhanced temporal video frame by extracting matched rigid moving objects in a previous or future frame and processing each of the extracted matched rigid moving objects with a corresponding rigid object in the enhanced temporal or spatial or raw current video frame.

10 Claims, 8 Drawing Sheets

(56) References Cited

U.S. PATENT DOCUMENTS

| | | | |
|---|---|---|---|
| 2007/0047653 A1* | 3/2007 | Kim et al. | 375/240.16 |
| 2007/0103408 A1* | 5/2007 | Tada et al. | 345/76 |
| 2007/0115260 A1* | 5/2007 | Lee | 345/166 |
| 2007/0206917 A1* | 9/2007 | Ono et al. | 386/68 |
| 2011/0096840 A1* | 4/2011 | Sano et al. | 375/240.16 |
| 2012/0320228 A1* | 12/2012 | Imade | 348/220.1 |
| 2015/0138441 A1* | 5/2015 | Pavani | 348/687 |
| 2015/0170342 A1* | 6/2015 | Pavani | 382/260 |

* cited by examiner

SYSTEM AND METHOD FOR TEMPORAL VIDEO IMAGE ENHANCEMENT

FIELD OF THE INVENTION

The present invention relates to image processing and more particularly to a spatio temporal system and method for enhancing low light video images.

BACKGROUND

Video/image processing in a low light environment introduces a tension or tradeoff between noise and motion. The low number of photons in the low light environment produces noisy images. Increasing the exposure time of a camera to allow collection of more photons reduces noise, but large exposure time values could increase motion blur due to potential object motion within the exposure period. Motion blur represents poor temporal resolution. That is, in images or videos with motion blur, scene changes over a small time interval are not resolved. Several solutions have been proposed to reduce the noise of the video images in a low light environment. For example 3-dimensional (3D) filtering methods filter the video both in space (2D) and time (1D). These methods attempt to decrease noise without increasing motion blur.

Furthermore, 3D filtering methods are expensive since they are computationally intensive, require large memory space and bandwidth, and introduce artifacts. Typically, in these methods, patch-based processing is required to compensate for motion. A patch refers to one or more pixels around a pixel of interest. To filter a pixel in a current frame, a patch around the pixel is selected and processed with similar patches in the current or other frames in the video. Such patch-based processing methods reduce noise due to averaging of multiple noisy pixels. Unlike reducing noise through increasing exposure time, patch-based processing does not increase motion blur due to appropriate selection of similar patches. A major drawback of such patch-based processing is that such processing is computationally extensive and expensive. Moreover, since 3D filtering methods compute a denoised image from multiple image frames, they require large memory size and high bandwidth.

Also, at low light, noise and motion are similar, separating motion from noise leads to unstable separation in low-contrast regions of the image. Typically, 3D filtering methods use thresholds for separating noise from motion. When an object moves in a low-contrast background, such threshold based separation of motion from noise would create undesirable artifacts in video due to the similarity of motion and noise. Additionally, temporal filtering degrades in performance when performed after typical processing steps in a video camera. For example, after mixing colors from the neighboring pixels, i.e., demosaicking, a frame's data size is typically three times the original size leading to additional complexity. Steps such as defect correction, white balancing, color correction, gamma correction, and video compression could alter pixel values differently in different frames leading to suboptimal temporal filtering performance.

In addition to temporal filtering, spatial filtering could also be used to reduce noise. Typical methods of spatial filtering involve averaging a noisy pixel with its surrounding pixels. While such filtering reduces noise in smooth regions of an image, it suffers from blurring out edges of the image. Edge blur represents poor spatial resolution. That is, in images or videos with edge blur, small details in the scene are not resolved. Traditional methods, such as bilinear filtering, preserve edges during denoising by performing computationally complex operations such as comparing the current pixel value with other pixel values in the neighborhood.

Accordingly, there is a need for an enhanced video image processing technique that decreases noise while minimizing motion blur and edge blur, without requiring a complex architecture, large memory, and/or high bandwidth.

SUMMARY

The present invention is a system and method for enhancing low light video imaging that reduces noise and image blurs, especially in a low light environment, by spatial video processing, temporal video processing or a combination thereof.

In some embodiments, the present invention is a method for improving quality of low light video images. The method includes: receiving a current video frame; generating a reference video frame from the received current video frame and one or more previous or future video frames; computing a metric to determine the likelihood of a pixel to correspond to stationary regions and moving regions in the received current video frame from the generated reference frame; computing a weight matrix from the received current video frame and the generated reference frame, wherein the weight matrix includes higher weight factors for the stationary regions and lower weight factors for the moving regions, in the received current video frame; and calculating a temporal video frame by applying the weight matrix with higher and lower weight factors to the received current video frame and the generated reference frame.

In some embodiments, the present invention is a method for improving the quality of low light video images. The method includes: receiving a current video frame; generating a reference video frame from the received current video frame; computing a metric to determine the likelihood of a pixel to correspond to smooth image regions and non-smooth image regions in the received current video frame by comparing the generated reference frame and the received current video frame; computing a weight matrix from the received current video frame and the generated reference frame, wherein the weight matrix includes higher weight factors for the smooth image regions and lower weight factors for the non-smooth image regions, in the received current video frame; and calculating a spatial video frame by applying the weight matrix with higher and lower weight factors to the received current video frame and the generated reference frame.

In some embodiments, the present invention is a method for improving quality of low light video images. The method includes: receiving a current video frame; identifying moving rigid objects in the received current video frame from the current video frame and a previous or future video frame; selecting one or more cardinal pixels in each identified moving rigid object in the received current video frame; identifying a patch around each cardinal pixel, in the received current video frame; calculating a matched patch in the previous or future video frame for each identified patch matching said each identified patch; defining a location of the cardinal pixel of each matched patch in the previous or future video frame; identifying matched rigid objects in the previous or future video frame corresponding to each defined location of each cardinal pixel; and extracting each identified matched rigid moving object from the previous or future frame and processing each of the extracted matched rigid moving objects with a corresponding rigid object in the received current video frame to generate an improved quality video image frame.

In some embodiments, the present invention is a method for improving quality of low light video images. The method includes: receiving a current video frame; temporally enhancing the received video frame by applying a first weight matrix including higher weight factors for stationary regions and lower weight factors for moving regions in the received current video frame to the received current video frame and a reference frame, to generate an enhanced temporal video frame; spatially enhancing the enhanced temporal video frame by applying a second weight matrix including higher weight factors for smooth regions and lower weight factors for non-smooth regions, in the enhanced temporal video frame, to generate an enhanced spatial video frame; and motion enhancing the enhanced temporal video frame by extracting matched rigid moving object in a previous or future frame and processing each of the extracted matched rigid moving objects with a corresponding rigid object in the enhanced temporal or spatial or raw current video frame to generate an improved quality video image frame.

DETAIL DESCRIPTION

In some embodiments, the present invention is a system and method for spatio temporal enhancement of low light video images. The invention minimizes motion blur and edge blur with weights (for example, using a weight matrix) instead of performing computationally expensive patch processing for each pixel. Furthermore, to reduce noise in pixels with motion, the invention identifies rigid moving objects in an image frame and processes those rigid objects with corresponding rigid objects in other frames of the video. According to the invention, a rigid moving object is a collection of pixels that move in unison. In other words, individual pixels within a rigid object exhibit similar motion vectors. This rigid object processing allows denoising of moving objects with dozens (instead of millions) of patches.

In some embodiments, the present invention generates the denoised images from only two image frames, that is, the current image frame and a reference (e.g., previous or future or a combination of both) image frame, in contrast to the conventional methods that require several different image frames. The reference frame encodes information from multiple previous or future frames. In some embodiments, the reference frame could be a weighted average of the multiple previous or future frames. In some embodiments, the reference frame could be computed from other mathematical operations to compress multiple previous or future frames into a single frame.

In some embodiments, the present invention operates before traditional video processing steps such as defect correction, demosaicking, white balancing, color correction, gamma correction, and compression to avoid suboptimal quality enhancement. These video processing steps may alter pixel values differently in different frames in ways that could alter the probability distribution of noise. The invention also compensates for signal dependent (shot) noise. Shot noise increases with signal intensity, leading to higher noise standard deviations in bright regions of image compared to noise standard deviations in dark regions of the image. As a result, in a low-light scene, bright stationary regions are more likely to be misinterpreted as motion than dark regions. Some embodiments of the current invention compensate for shot noise by taking its statistics into account during the computation of weights.

Figure 1:
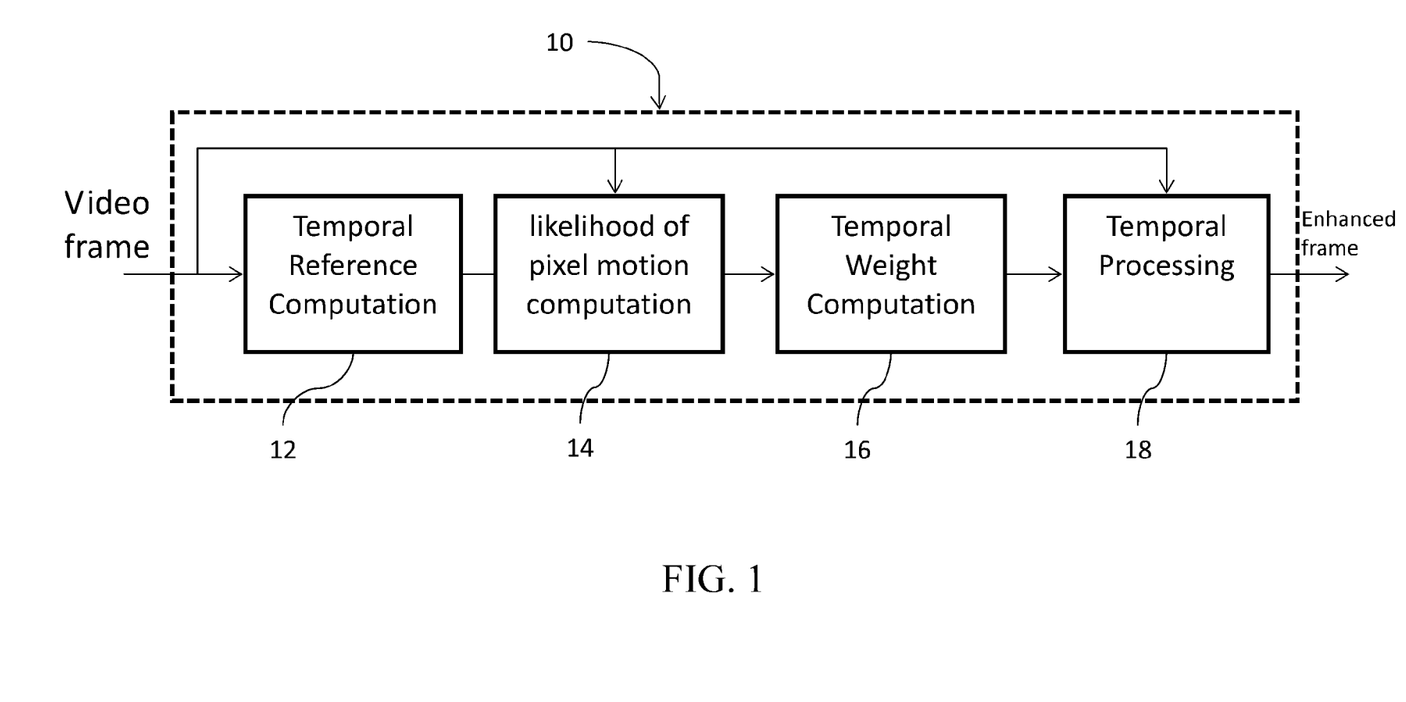
FIG. 1 is an exemplary block diagram for a temporal enhancement module, according to some embodiments of the present invention.

FIG. 1 is an exemplary block diagram for a temporal enhancement module, according to some embodiments of the present invention. As shown, a temporal enhancement module 10 includes a temporal reference computation module 12, a likelihood of pixel motion computation module 14, a temporal weight computation module 16 and a temporal processing module 18. These modules may be implemented in software, firmware, dedicated hardware or a combination thereof. For example one or more modules may be implemented in software executed by a general or special purpose computer, one or more modules may be implemented in firmware executed by one or more processors, and/or one or more modules may be implemented in hardware using integrated circuit or other types of electronic circuits.

The temporal reference computation module 12 takes the incoming video signal as its input and generates a temporal video frame reference to be outputted to the likelihood of pixel motion computation module 14. The video frame input may be coming from one or more image sensor (before or after some image processing), from spatial enhancement module 30 of FIG. 3, or from the motion enhancement module 50 of FIG. 5. The likelihood of pixel motion computation module 14 then generates a likelihood matrix representing the likelihood that a group of pixels have moved in the current video frame. The temporal weight computation module 16 utilizes the likelihood of pixel motion to generate a weight matrix. The weight matrix includes higher weight factors for the stationary regions (pixels) and lower weight factors for the moving regions (pixels), in the received current video frame. The temporal processing module 18 then calculates an enhanced video frame by applying the weight matrix with higher and lower weight factors to the received current video frame and the generated reference frame. That is, it applies the higher weight factors to the stationary regions (pixels) and lower weight factors to the moving regions (pixels), in the received current video frame. This way, since weights (for example, a weight matrix) replace thresholds to separate noise from motion, no temporal artifacts are introduced, according to the present invention.

Figure 2:
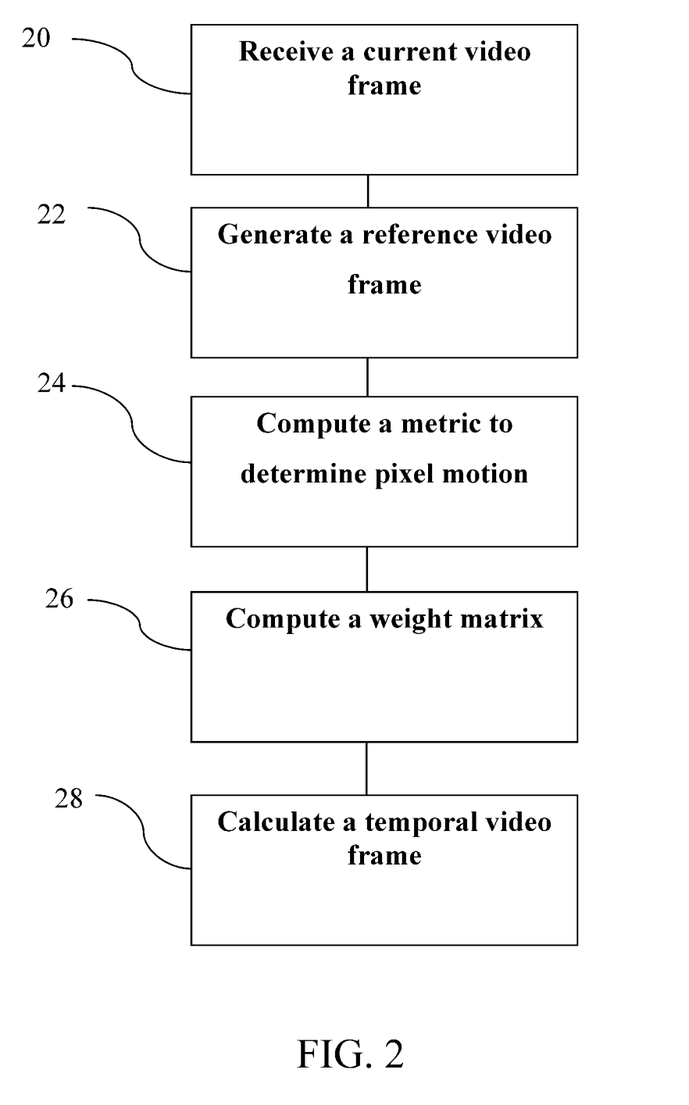
FIG. 2 is an exemplary process flow for temporal enhancement, according to some embodiments of the present invention.

FIG. 2 is an exemplary process flow for temporal enhancement, according to some embodiments of the present invention. As shown in block 20, a (current) video frame is received. The video frame may have already been processed by various known image processing techniques to enhance the raw video generated by the image sensors. In block 22, a reference video frame is generated from the received current video frame and one or more previous or future video frames. One or more previous or future video frames are stored in a memory buffer to be used to generate the reference frame. The reference video frame is then stored or buffered in a memory. In block 24, a metric is computed to determine the likelihood of a pixel corresponding to stationary regions and moving regions in the received current video frame from the generated reference frame. In some embodiments, the likelihood metric may be the absolute difference of a smoothened current frame and a smoothened reference frame. In some embodiments, the likelihood metric may involve other mathematical operations to generate a high metric value when a reference frame pixel is much different than its corresponding current frame pixel, and low metric value when the reference frame pixel is similar to its corresponding current frame pixel.

A weight matrix is then generated from the received current video frame and the generated reference frame, as depicted in block 26. The weight matrix includes higher weight factors for the stationary regions and lower weight factors for the moving regions, in the received current video frame. Processing the current and reference frames with such a weight matrix allows noise reduction without incurring motion blur. The magnitude of a pixel's weight matrix value is related to the extent of information being used from the reference frame. When the weight value is high, more information from the reference frame is used, leading to superior noise reduction. On the other hand, when the weight value is low, less information from the reference frame is used, leading to decreased motion blur.

In block 28, an enhanced temporal video frame is calculated by applying the weight matrix with higher and lower weight factors to the received current video frame and the generated reference frame. In doing so, enhanced images with reduced noise and reduced motion blur are created. Such enhanced images allow better resolvability of fine details in a high resolution scene. Further, they also allow better video compression due to reduced noise. When compared to traditional images, these enhanced images allow transmitting higher quality video at the same bitrate or using lower bitrate to transfer similar quality video. In some embodiments, only storage or buffering of two frames is required, that is the current frame and the reference frame to generate an enhanced temporal frame.

In some embodiments, the enhanced temporal video frame may be calculated according to the following equations.

$$I_t = \frac{I_c + \beta W_t I_{rt}}{1 + \beta W_t} \quad (1)$$

$$W_t = \frac{\sqrt{H_c}}{|H_c - H_{rt}| + \delta} \quad (2)$$

$$I_{rt} = I_c \quad ; t = 1 \quad (3)$$
$$\frac{I_c + \beta I_{rt}}{1 + \beta} \quad ; t > 1$$

$$H_c = I_c * 1(b, b) \quad (4)$$

$$H_{rt} = I_{rt} * 1(b, b) \quad (5)$$

where $I_t$ is the enhanced temporal frame, $I_c$ is the current frame, $I_{rt}$ is the temporal reference frame, $W_t$ is the temporal weight matrix, $\beta$ is the temporal reference weight, t is the frame index, $\delta$ is a raiser, $H_c$ is the smoothened current frame, 1 is a matrix of ones, and $H_{rt}$ is the smoothened reference frame.

In some embodiments, the reference video frame is generated by weighted averaging of the current video frame with the previous or future video frame. In some embodiments, the likelihood metric is computed by finding the difference between the current video frame and the reference frame. In some embodiments, the weight matrix is computed by finding the inverse of the likelihood metric. In some embodiments, the temporal video frame is calculated by weighted averaging the current video frame and the reference frame by using the weight matrix.

Figure 3:
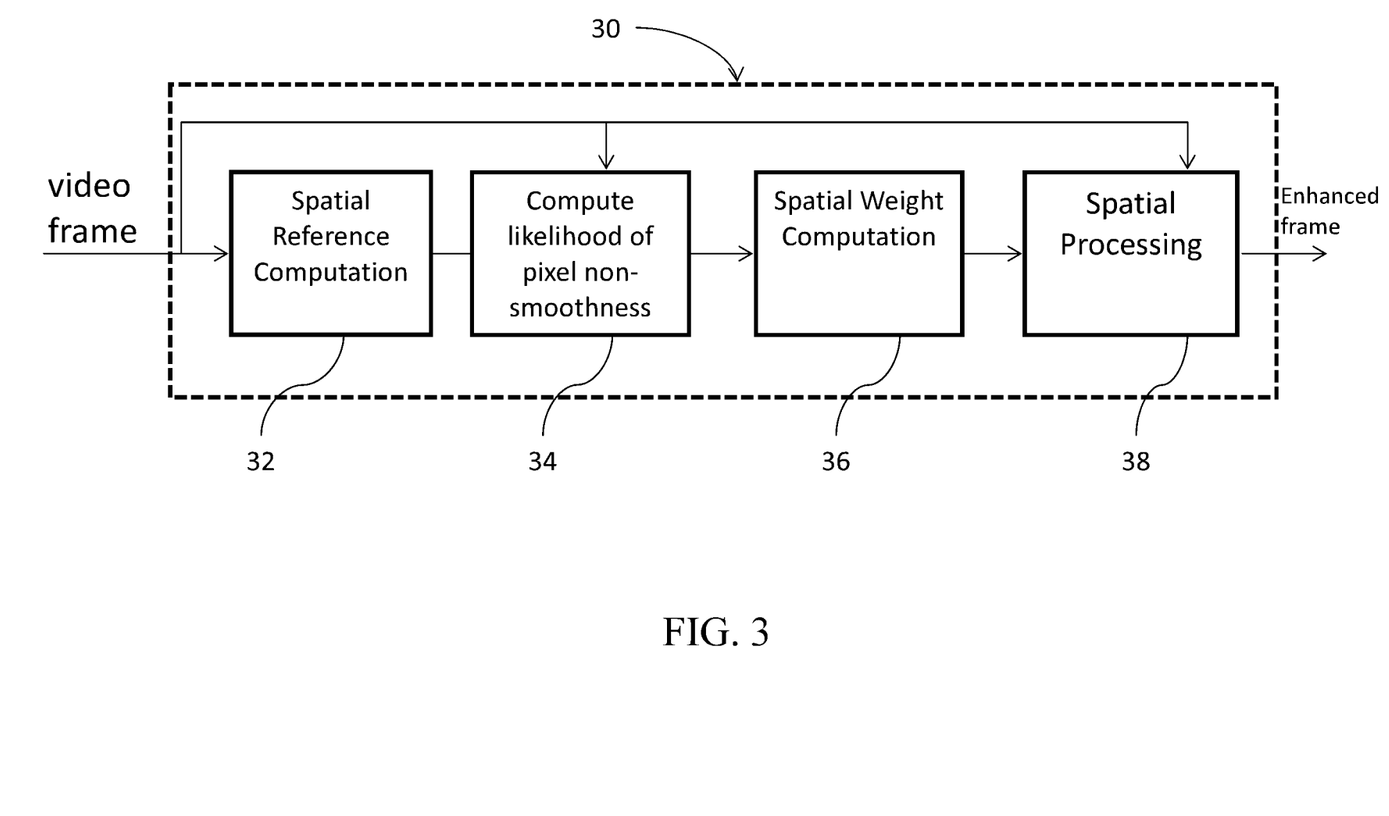
FIG. 3 is an exemplary block diagram for a spatial enhancement module, according to some embodiments of the present invention.

FIG. 3 is an exemplary block diagram for a spatial enhancement module, according to some embodiments of the present invention. As illustrated, a spatial enhancement module 30 includes a spatial reference computation module 32, a likelihood of pixel non-smoothness computation module 36, a spatial weight computation module 36 and a spatial processing module 38. Similar to those modules depicted in FIG. 1, these modules may be implemented in software, firmware, dedicated hardware or a combination thereof. For example one or more modules may be implemented in software executed by a general or special purpose computer, one or more modules may be implemented in firmware executed by one or more processors, and/or one or more modules may be implemented in hardware using integrated circuit or other types of electronic circuits.

The spatial reference computation module 32 takes the incoming video signal as its input and generates a spatial video frame reference to be outputted to the likelihood of pixel smoothness computation module 34. The video frame input may be coming from one or more image sensors (for example, before or after some image processing), from temporal enhancement module 10 of FIG. 1, or from the motion enhancement module 50 of FIG. 5. The likelihood of pixel smoothness computation module 34 then generates a likelihood matrix representing the likelihood for a pixel to be present in a smooth region of the current video frame. In some embodiments, this likelihood may be computed as an absolute difference between a pixel in the current frame and the spatial reference frame. If a pixel is present in a smooth region, its likelihood value is low. Alternatively, if a pixel is located in a non-smooth region, it's likelihood value is high. In some embodiments, other mathematical operations could be performed on the current frame and a reference frame to achieve the above mentioned behavior for the likelihood matrix.

The spatial weight computation module 36 utilizes the likelihood of pixel non-smoothness to generate a weight matrix. The weight matrix includes higher weight factors for the smooth image regions (pixels) and lower weight factors for the non-smooth image regions (pixels), in the received current video frame. The spatial processing module 38 then calculates an enhanced video frame by applying the weight matrix with higher and lower weight factors to the received current video frame and the generated reference frame. That is, it applies the higher weight factors to the smooth regions (pixels) and lower weight factors to the non-smooth regions (pixels), in the received current video frame.

Figure 4:
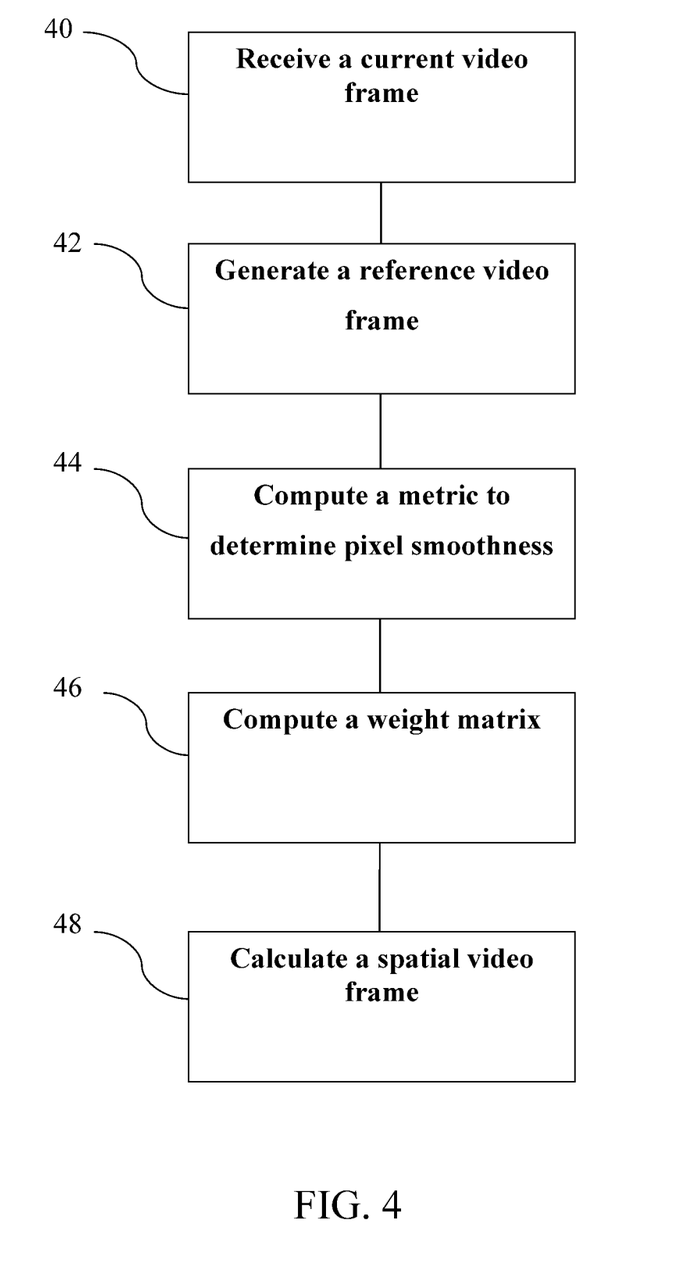
FIG. 4 is an exemplary process flow for spatial enhancement, according to some embodiments of the present invention.

FIG. 4 is an exemplary process flow for spatial enhancement, according to some embodiments of the present invention. As shown in block 40, a (current) video frame is received. Again, if the video frame is coming from the image sensors, the video frame may have already been processed by various known image processing techniques to enhance the raw video generated by the image sensors. A reference video frame is then generated from the received current video frame, in block 42. In block 44, a metric is computed to determine the likelihood of a pixel to correspond to smooth image regions and non-smooth image regions in the received current video frame. This may be accomplished by comparing the reference frame and the received current video frame. For example, this likelihood may be computed as an absolute difference between a pixel in the current frame and the spatial reference frame.

In block 46, a weight matrix is computed from the received current video frame and the generated reference frame by using the non-smoothness likelihood matrix. The weight matrix includes higher weight factors for the identified smooth image regions and lower weight factors for the identified non-smooth image regions, in the received current video frame. This enables minimizing noise in smooth regions of the image, without causing edges in images to appear blurred. The magnitude of a pixel's weight matrix value is related to the extent of information being used from the reference frame. When the weight value is high, more information from the reference frame is used, leading to superior noise reduction. On the other hand, when the weight value is low, less information from the reference frame is used, leading to decreased edge blur.

In block 48, an enhanced video frame is computed by applying the weight matrix with higher and lower weight factors to the received current video frame and the generated reference frame. In doing so, enhanced images with reduced noise and reduced edge blur are created. Such enhanced images allow better resolvability of fine details in a high resolution scene. Further, they also allow better video compression due to reduced noise. When compared to traditional images, these enhanced images allow transmitting higher quality video at the same bitrate or using lower bitrate to transfer similar quality video.

In some embodiments, the enhanced spatial video frame may be calculated according to the following equations.

$$I_s = \frac{I_c + \alpha W_s I_{rs}}{1 + \alpha W_s} \quad (6)$$

$$W_s = \frac{\sqrt{I_{rs}}}{|I_c + I_{rs}| + \delta} \quad (7)$$

$$I_{rs} = I_c * 1(b, b) \quad (8)$$

where $I_s$ is the enhanced spatial frame, $I_c$ is the current frame, $I_{rs}$ is the spatial reference frame, $W_s$ is the spatial weight matrix, $\alpha$ is the spatial reference weight, 1 is a matrix of ones, and $\delta$ is a raiser.

In some embodiments, the reference video frame may be generated by low-pass filtering the current video frame. In some embodiments, the likelihood metric is determined by finding the difference between the current video frame and the reference frame. In some embodiments, the weight matrix is determined by finding the inverse of the likelihood metric. In some embodiments, the spatial video frame is calculated by weighted averaging the current video frame and the reference frame by using the weight matrix.

Figure 5:
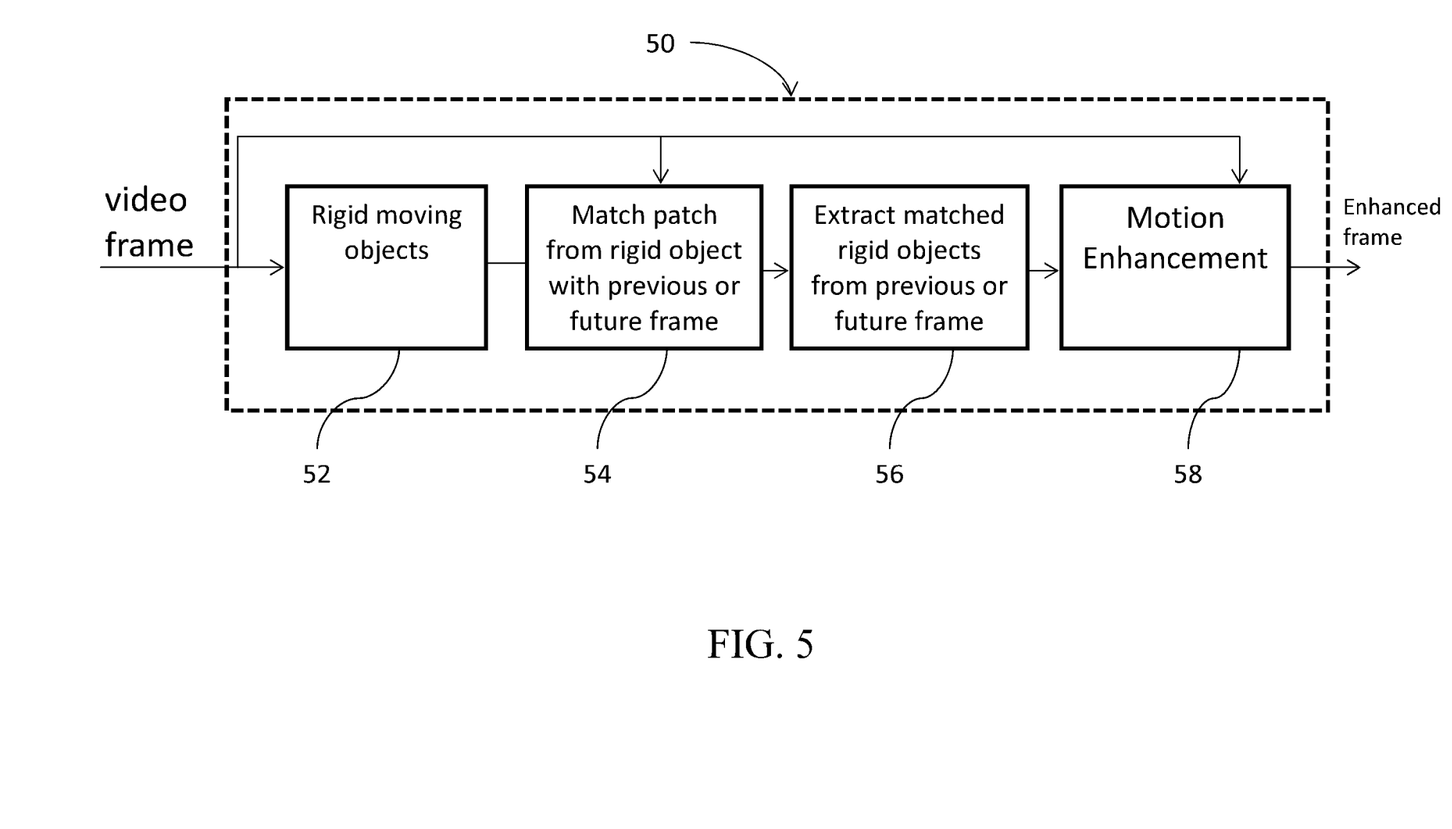
FIG. 5 is an exemplary block diagram for a motion enhancement module, according to some embodiments of the present invention.

FIG. 5 is an exemplary block diagram for a motion enhancement module, according to some embodiments of the present invention. As depicted, a motion enhancement module 50 includes a rigid moving objects module 52, a match patch module 54, an extract module 56 and a motion enhancement module 58. Similar to those modules depicted in FIGS. 1 and 3, these modules may be implemented in software, firmware, dedicated hardware or a combination thereof. The rigid moving objects module 52 identifies rigid objects in the received frame that are determined to have moved. In a video sequence of moving objects, motion vectors of all pixels in the video are typically not independent. By decomposing moving objects in a scene into a small number of rigid objects, with each rigid object encompassing a set of pixels with similar motion vectors, computational complexity can be greatly reduced from one patch based matching per pixel to one patch based processing to a collection of pixels in the rigid object.

In some embodiments, rigid objects may be selected from the difference between a smoothened current frame and a smoothened previous or future frame in the video sequence. Although video frames can exhibit many such rigid objects (for example, in a scene with heavy motion), our invention takes into account that noise improvement is observable only in big rigid objects that encompasses many pixels. In some embodiments, only such large rigid objects are selected for processing. Typically, such rigid object processing allows denoising of moving objects with dozens of patches, instead of millions of patches in a megapixel video. The match patch module 54 then matches patches from the identified moving rigid objects with corresponding patches of the previous or future video frame. Once a rigid object is selected for processing in the current frame, one or more cardinal pixels are chosen in it. A small patch of pixels around the cardinal pixels is considered for patch-based matching with a previous or future frame.

In some embodiments, one of the cardinal pixels could be the centroid of the rigid object. The number of patch-based matching per rigid object is much smaller than the number of pixels in a rigid object, leading to reduction in computational complexity than patched-based processing of all pixels in the image. The video frame input may be coming from one or more image sensors (for example, before or after some basic image processing), from temporal enhancement module 10 of FIG. 1, or from the spatial enhancement module 30 of FIG. 3.

The extract module 56 then extracts the matched rigid objects from the previous or future video frame. Once a match for the cardinal points in the current frames is found in a previous or future frame, their encompassing rigid objects are extracted from the previous or future frame by using geometric information from the current frame. Since the spatial extent of a rigid object around its cardinal point is known in the current frame, this information is used to extract a corresponding rigid object in the previous or future frame. The extracted rigid object from the previous or future frame may be used for processing with its corresponding rigid object in the current frame for reducing noise. The motion enhancement module 58 then processes the corresponding rigid objects from the current and previous or future frames. After processing, image quality of the rigid object is enhanced due to reduction of noise. In some embodiments, processing may involve weighted averaging of rigid object from the current frame with the rigid object extracted from the previous or future frame.

Figure 6:
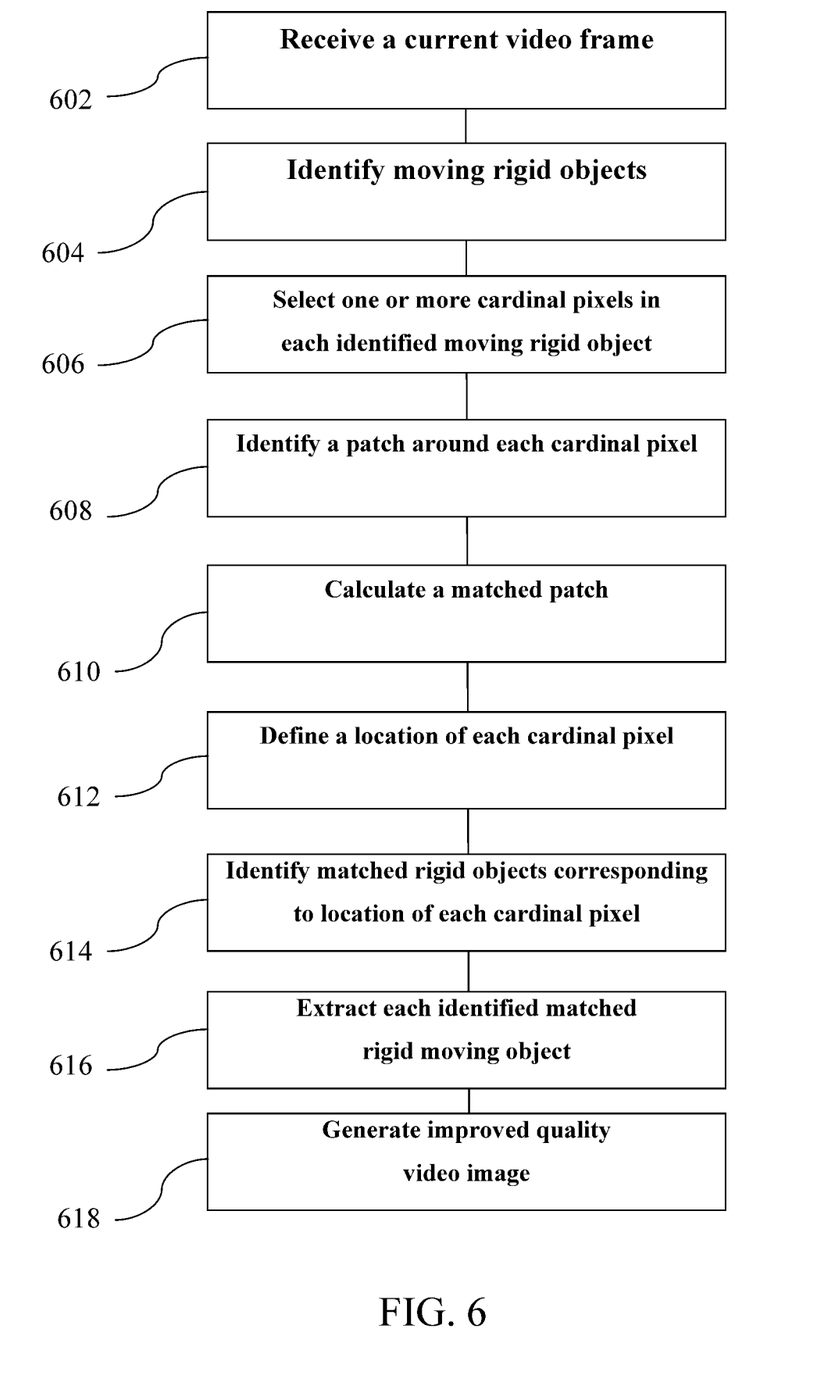
FIG. 6 is an exemplary process flow for motion enhancement, according to some embodiments of the present invention.

FIG. 6 is an exemplary process flow for motion enhancement, according to some embodiments of the present invention. As shown in block 602, a (current) video frame is received. Once again, if the video frame is coming from one or more image sensors, the video frame may have already been processed by various known image processing techniques to enhance the raw video generated by the image sensors. In block 604, moving rigid objects in the received current video frame are identified from the current video frame and a previous video frame. In block 606, one or more cardinal pixels are selected in each identified moving rigid object in the received current video frame. Cardinal pixels are meant to provide a robust motion vector for the rigid object. Multiple cardinal pixels may be selected to increase robustness. Cardinal pixels are typically selected so that they represent the entire geometrical region of the rigid object. In some embodiments, the cardinal pixel may be a centroid pixel of the rigid object. In some embodiments, a rigid object may be divided in to two or more sub-regions, and the centroid of each sub-region may be considered as a cardinal pixel of the rigid object.

A patch around each cardinal pixel is then identified, in the received current video frame, in block 608. A patch may consist of two or more pixels in both horizontal and vertical dimensions that capture sufficient amount of spatial variations necessary for patch matching. In some embodiments, the size of the patch may be a constant. In some embodiments, the size of the patch may depend on the amount of spatial variation in the rigid object. For example, patch sizes could be smaller for rigid objects with a lot of spatial texture and patch sizes could be larger for rigid objects with fewer spatial texture. In block 610, a matched patch is calculated in the previous or future video frame for each identified patch. The location of the cardinal pixel of each matched patch is then defined in the previous or future video frame, in block 612. In block 614, matched rigid objects in the previous or future video frame corresponding to each defined location of each cardinal pixel are identified. These identified matched rigid objects in the previous or future frame represent how the rigid object in the current frame was imaged at a previous or future time.

Figure 8:
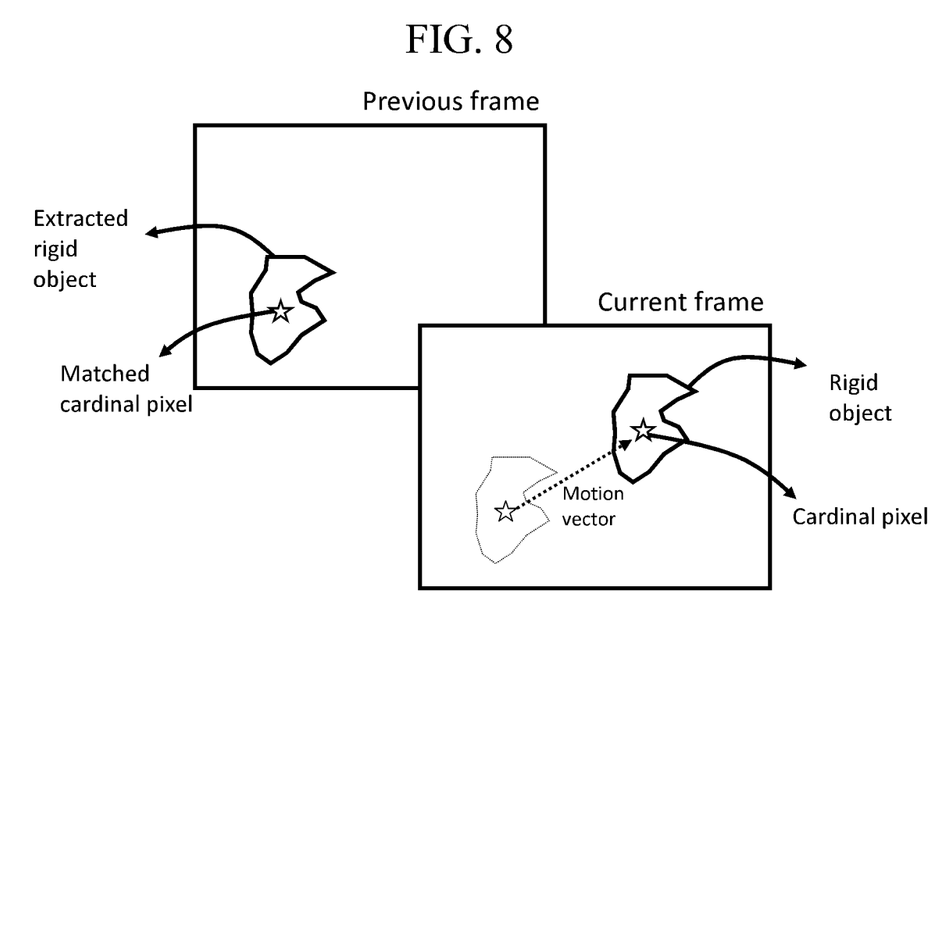
FIG. 8 is an exemplary diagram depicting an extracted object and its cardinal pixel in a current and a previous video frame.

FIG. 8 is an exemplary diagram depicting an extracted object and its cardinal pixel in a current and a previous video frame. As shown, a rigid moving object is identified in the current frame. A cardinal pixel is located in the rigid object. A small patch around the cardinal pixel is selected in the current frame and matched with the previous frame. The matched cardinal point in the previous frame represents the position of best match for the patch in the current frame. By using geometrical size and shape information from the current frame, a corresponding rigid object is extracted from the previous frame. This extracted rigid object from the previous frame is processed with the rigid object in the current frame to reduce noise.

Referring back to FIG. 6, in block 616, each identified matched rigid moving object is extracted from the previous or future frame and processed with a corresponding rigid object in the received current video frame to generate an improved quality video image frame, in block 618. The processing of a rigid object of in the current frame with its corresponding rigid object in the previous or future frame enhances signal while averaging out noise, leading to an enhancement in image quality.

In some embodiments, the moving rigid objects are identified by finding the difference between the current video frame and the previous or future video frame. In some embodiments, the cardinal pixels are selected by dividing rigid objects into two or more smaller regions. In some embodiments, the patch around each cardinal pixel is identified by determining an amount of spatial variation in the rigid object.

In some embodiments, the matched patch is calculated by finding the difference between a patch in the current frame with similarly sized patches in the previous or future frames. In some embodiments, the location of the cardinal pixel of each matched patch in the previous or future video frame is identified by finding a pixel in a center of the matched patch.

In some embodiments, the matched rigid object in the previous or future video frame is identified by using geometric size or shape information about the rigid object in the current frame. In some embodiments, the processing of the rigid object from the current frame is performed by weighted averaging of the rigid object from the current frame and the rigid object from the previous or future frame.

Figure 7:
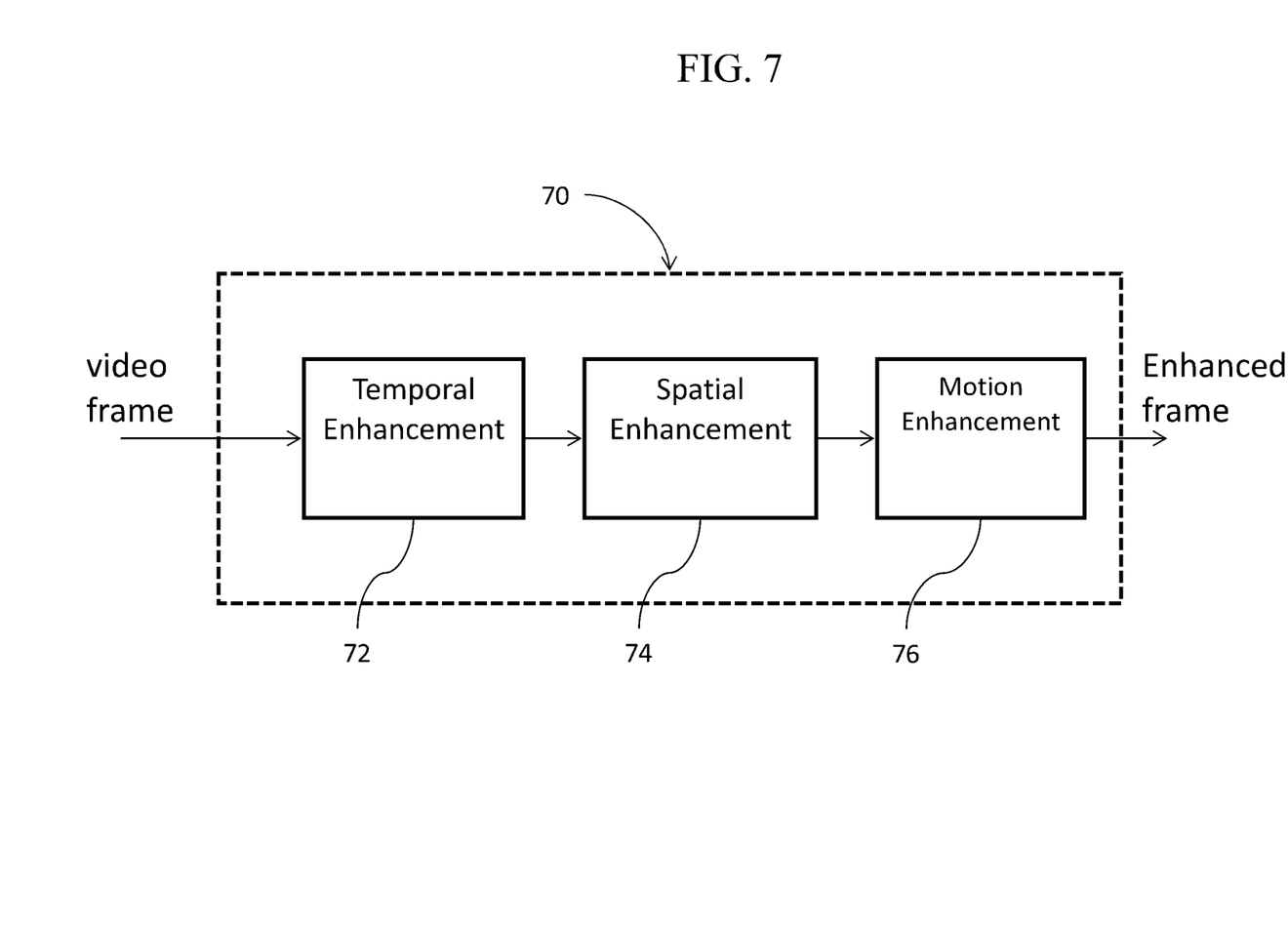
FIG. 7 is an exemplary block diagram for a video image enhancement module, according to some embodiments of the present invention.

FIG. 7 is an exemplary block diagram for a video image enhancement module, according to some embodiments of the present invention. As shown, a video image enhancement module 70 includes a temporal enhancement module 72, a spatial enhancement module 74, and a motion enhancement module 76 in series. The temporal enhancement module 72 temporally enhances the received video frame by applying a first weight matrix including higher weight factors for stationary regions and lower weight factors for moving regions in the received current video frame to the received current video frame and a reference frame, to generate an enhanced temporal video frame. The spatial enhancement module 74 spatially enhances the enhanced temporal video frame by applying a second weight matrix including higher weight factors for smooth regions and lower weight factors for non-smooth regions, in the enhanced temporal video frame, to generate an enhanced spatial video frame. The motion enhancement module 76 further improves the enhanced spatial video frame by extracting matched rigid moving objects in a previous or future frame and processing each of the extracted matched rigid moving objects with a corresponding rigid object in the enhanced spatial video frame to generate an improved quality video image frame.

Although, the order of the modules depicted in FIG. 7 are module 72, module 74 and module 76, in these embodiments, the present invention is not limited to the depicted order and the module 72, 74 and 76 may be arrange in any other order. This way, the temporal enhancement module 72 temporally enhances the video image by reducing noise and reducing motion blur, the spatial enhancement module 74 spatially enhances the video image by reducing noise and reducing edge blur, and the motion enhancement module 76 enhances the motion components of the video image by reducing noise in moving regions.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for improving quality of low light video images, the method comprising:
  receiving a current video frame;
  generating a reference video frame from the received current video frame and one or more previous or future video frames;
  computing a likelihood metric to determine the likelihood of a pixel to correspond to stationary regions and moving regions in the received current video frame from the generated reference frame;
  computing a weight matrix from the received current video frame and the generated reference frame, wherein the weight matrix includes higher weight factors for the stationary regions and lower weight factors for the moving regions, in the received current video frame, and wherein computing the weight matrix comprises finding an inverse of the likelihood metric; and calculating a temporal video frame by applying the weight matrix with higher and lower weight factors to the received current video frame and the generated reference frame.

2. The method of claim 1, wherein generating a reference video frame further comprises weighted averaging of the current video frame with the previous or future video frame.

3. The method of claim 1, wherein computing a likelihood metric further comprises finding the difference between the current video frame and the reference frame.

4. The method of claim 1, wherein calculating a temporal video frame further comprises weighted averaging the current video frame and the reference frame by using the weight matrix.

5. A method for improving quality of low light video images, the method comprising:

receiving a current video frame;

temporally enhancing the received current video frame by applying a first weight matrix including higher weight factors for stationary regions and lower weight factors for moving regions in the received current video frame to the received current video frame, and to a reference frame, to generate an enhanced temporal video frame;

spatially enhancing the enhanced temporal video frame by applying a second weight matrix including higher weight factors for stationary regions and lower weight factors for moving regions, in the enhanced temporal video frame, to generate an enhanced spatial video frame; and motion enhancing the enhanced temporal video frame by extracting matched rigid moving objects in a previous or future frame and processing each of the extracted matched rigid moving objects with a corresponding rigid object in the enhanced temporal video frame to generate an improved quality video image frame.

6. The method of claim 5, further comprising generating a reference video frame by weighted averaging of the current video frame with a previous or future video frame.

7. The method of claim 5, further comprising computing a likelihood metric to determine the likelihood of a pixel to correspond to stationary regions and moving regions in the received current video frame from the reference frame.

8. The method of claim 7, wherein computing a likelihood metric further comprises finding the difference between the current video frame and the reference frame.

9. The method of claim 7, wherein the first weight matrix is computed by finding an inverse of the likelihood metric.

10. The method of claim 5, wherein said generating an enhanced temporal video frame further comprises weighted averaging the current video frame and the reference frame by using the first weight matrix.

* * * * *